(12) United States Patent
Shin et al.

(10) Patent No.: US 11,328,711 B2
(45) Date of Patent: May 10, 2022

(54) USER ADAPTIVE CONVERSATION APPARATUS AND METHOD BASED ON MONITORING OF EMOTIONAL AND ETHICAL STATES

(71) Applicant: KOREA ELECTRONICS TECHNOLOGY INSTITUTE, Seongnam-si (KR)

(72) Inventors: Saim Shin, Seoul (KR); Hyedong Jung, Seoul (KR); Jinyea Jang, Suwon-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 192 days.

(21) Appl. No.: 16/503,953

(22) Filed: Jul. 5, 2019

(65) Prior Publication Data
US 2021/0005187 A1 Jan. 7, 2021

(51) Int. Cl.
*G10L 15/22* (2006.01)
*G10L 15/18* (2013.01)
(Continued)

(52) U.S. Cl.
CPC .......... *G10L 15/1822* (2013.01); *G06V 20/40* (2022.01); *G10L 15/16* (2013.01);
(Continued)

(58) Field of Classification Search
None
See application file for complete search history.

(56) References Cited

U.S. PATENT DOCUMENTS

| 9,922,642 B2* | 3/2018 | Pitschel | G10L 15/063 |
| 2003/0167167 A1* | 9/2003 | Gong | G10L 15/22 |
| | | | 704/250 |

(Continued)

FOREIGN PATENT DOCUMENTS

| JP | 2016-109897 A | 6/2016 |
| KR | 10-2003-0046444 A | 6/2003 |
| KR | 10-2017-0111875 A | 10/2017 |

OTHER PUBLICATIONS

Korean Office Action dated May 28, 2021, in connection with the Korean Patent Application No. 10-2017-0167996.
(Continued)

*Primary Examiner* — Richard Z Zhu
(74) *Attorney, Agent, or Firm* — Hauptman Ham, LLP

(57) ABSTRACT

A user adaptive conversation apparatus generating a talk for a conversation based on emotional and ethical states of a user. A voice recognition unit converts a talk of the user in a conversational situation into a natural language script form to generate talk information. An artificial visualization unit generates situation information by recognizing talking situation from a video and generates intention information indicating an intention of the talk. A natural language analysis unit converts the situation information and the intention information into the natural language script form. A natural language analysis unit analyzes the talk information, the intention information, and the situation information. A conversation state tracing unit generates current talk state information representing a meaning of the talk information by interpreting the talk information according to the intention information and the situation information, and determines next talk state information including candidate responses corresponding to the current talk status information.

4 Claims, 3 Drawing Sheets

(51) Int. Cl.
*G10L 25/63* (2013.01)
*G10L 15/16* (2006.01)
*G06V 20/40* (2022.01)
*G06F 40/30* (2020.01)

(52) U.S. Cl.
CPC .............. *G10L 15/22* (2013.01); *G10L 25/63* (2013.01); *G06F 40/30* (2020.01); *G10L 15/1815* (2013.01); *G10L 2015/226* (2013.01); *G10L 2015/227* (2013.01)

(56) References Cited

U.S. PATENT DOCUMENTS

| | | | |
|---|---|---|---|
| 2013/0174034 A1* | 7/2013 | Brown | G06F 16/951 |
| | | | 715/708 |
| 2016/0042735 A1* | 2/2016 | Vibbert | G10L 15/222 |
| | | | 704/257 |
| 2016/0188565 A1* | 6/2016 | Robichaud | G06F 16/3334 |
| | | | 704/9 |
| 2017/0046124 A1* | 2/2017 | Nostrant | G10L 15/16 |
| 2019/0103102 A1* | 4/2019 | Tseretopoulos | G10L 15/183 |
| 2019/0103127 A1* | 4/2019 | Tseretopoulos | G06F 40/247 |
| 2020/0243088 A1* | 7/2020 | Hori | G10L 15/22 |

OTHER PUBLICATIONS

Grant of Patent issued on Nov. 5, 2021, for corresponding Korean Patent Application No. 10-2017-0167996, along with an English translation.

* cited by examiner

USER ADAPTIVE CONVERSATION APPARATUS AND METHOD BASED ON MONITORING OF EMOTIONAL AND ETHICAL STATES

TECHNICAL FIELD

The present disclosure relates to a conversation apparatus and method and, more particularly, to a user adaptive conversation apparatus and method based on monitoring of emotional and ethical states of a user.

BACKGROUND

An intelligent agent, which is an autonomous entity acting towards achieving goals in a complex and changing environment, has been actively studied in the field of computer science, in particular, artificial intelligence, under a name of an autonomous adaptation agent, a software agent, or an interface agent.

Due to a rapid development of a network and a higher prevalence of high performance personal computers, important topics in intelligent agent researches include a mobility that the agent is acting while moving among various systems on the network as needed, rather than being fixed in a single computer, and an adaptability that the agent gradually adapts itself to a user and an environment to improve its operational performance.

A manual design of the intelligent agent requires a designer to have sufficient knowledge of an application domain and has a disadvantage that the performance of the system is fixed at an early stage. To overcome the limitation and the disadvantage, attempts have been made to design the intelligent agent using a machine learning in which an algorithm of the intelligent agent is improved through interactions of the intelligent agent with the environment.

In a conversation system equipped with the machine learning functionality that learns from conversations with human beings, an ability of the intelligent agent to generate a sentence may be improved continuously so as to provide various types of answers to a user. For example, while an initial-stage agent may say "You are leaving Seoul. And you go to New York. When do you leave?", a machine learning agent may improve its language skills through the machine learning to say a sophisticated sentence such as "When do you leave Seoul for New York?"

However, even the conversation system equipped with the machine learning functionality that learns from the conversations with human beings may provide a sentence that can offend a conversation partner or an answer that is not suited for common ethics or common sense. Therefore, a solution for solving such a problem is required.

PRIOR ART REFERENCE

Patent Literature

Korean Laying-open Patent Publication No. 2017-0111875 published on Oct. 12, 2017, and entitled APPARATUS AND METHOD FOR DOLL CONTROL USING APP

SUMMARY

Provided are user adaptive conversation apparatuses and methods, in an interactive conversation system, that monitor emotional and ethical states of a user through various analyses of a conversational situation to generate a talk for the conversation suitable for a monitoring result.

Additional aspects will be set forth in part in the description which follows and, in part, will be apparent from the description, or may be learned by practice of the presented exemplary embodiments.

According to an aspect of an exemplary embodiment, a user adaptive conversation apparatus includes: a voice recognition unit configured to convert a talk of a user in a conversational situation into a natural language script form to generate talk information; an artificial visualization unit configured to recognize a talking situation from a video acquired in the conversational situation to generate situation information indicating the talking situation and generate intention information indicating an intention of the talk; a natural language analysis unit configured to convert the situation information and the intention information into the natural language script form; a natural language analysis unit configured to perform a natural language analysis for the talk information, the intention information, and the situation information; and a conversation state tracing unit configured to generate current talk state information representing a meaning of the talk information by interpreting the talk information according to the intention information and the situation information, and determine next talk state information that includes a plurality of candidate responses corresponding to the current talk status information.

The user adaptive conversation apparatus may further include: an emotion tracing unit configured to generate emotion state information indicating an emotional state of the user based on the talk information, the intention information, and the situation information; and an ethic analysis unit configured to generate ethical state information indicating ethics of the conversation based on the talk information, the intention information, and the situation information.

The user adaptive conversation apparatus may further include: a multi-modal conversation management unit configured to select one of the plurality of candidate responses according to at least one of the emotion state information and the ethical state information to determine final next talk state information including a selected response.

The user adaptive conversation apparatus may further include: a natural language generation unit configured to convert the final talk state information into an output conversation script having the natural language script form; and an adaptive voice synthesizing unit configured to synthesize a voice signal in which an intonation and conforming to at least one of the emotion state information, the situation information, and the intention information is given to the output conversation script.

According to an aspect of an exemplary embodiment, a user adaptive conversation method, include: converting a talk of a user in a conversational situation into a natural language script form to generate talk information; recognizing a talking situation from a video acquired in the conversational situation to generate situation information indicating the talking situation and generate intention information indicating an intention of the talk; converting the situation information and the intention information into the natural language script form; performing a natural language analysis for the talk information, the intention information, and the situation information; generating current talk state information representing a meaning of the talk information by interpreting the talk information according to the intention information and the situation information; and determining next talk state information that includes a plurality of candidate responses corresponding to the current talk status information.

The user adaptive conversation method may further include: generating emotion state information indicating an emotional state of the user based on the talk information, the intention information, and the situation information; and generating ethical state information indicating ethics of the conversation based on the talk information, the intention information, and the situation information.

The user adaptive conversation method may further include: selecting one of the plurality of candidate responses according to at least one of the emotion state information and the ethical state information to determine final next talk state information including a selected response.

The user adaptive conversation method may further include: converting the final talk state information into an output conversation script having the natural language script form; and synthesizing a voice signal in which an intonation and conforming to at least one of the emotion state information, the situation information, and the intention information is given to the output conversation script.

The present disclosure described above provides conversation apparatuses and methods capable of conversation reflecting the dynamic emotional changes of the user and confirming to the situation of the user. In particular, the present disclosure provides conversation apparatuses and methods for preventing any unethical conversation. Furthermore, the present disclosure provides conversation apparatuses and methods for adapting the conversation to the emotions and situations of the user to increase an empathy with the user.

According to the present disclosure, the emotion state of the user currently in conversation is recognized, and the monitoring result is applied to the conversation system to maintain a conversation confirming to the emotion state of the user.

The present disclosure may apply a monitoring result for the ethics of the current conversation to the conversation system to prevent any unethical conversation.

The present disclosure can provide a customized conversation apparatus and method which take emotional, ethical, and personalized characteristics of conversation user into account.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
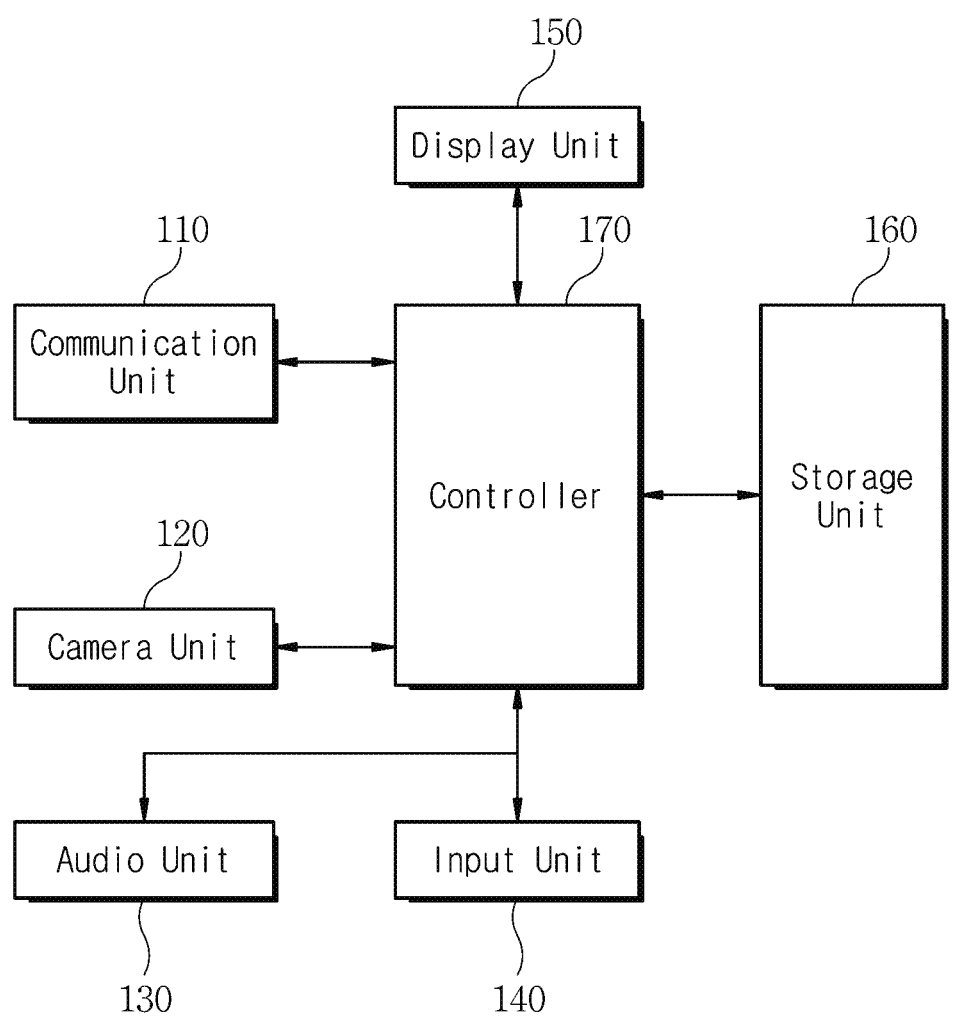
FIG. 1 is a block diagram of a user adaptive conversation apparatus based on monitoring of emotional and ethical states according to an exemplary embodiment of the present disclosure.

The drawings described herein are for illustration purposes only and are not intended to limit the scope of the present disclosure in any way.

DETAILED DESCRIPTION

The terms and words used in the following description and appended claims are not necessarily to be construed in an ordinary sense or a dictionary meaning, and may be appropriately defined herein to be used as terms for describing the present disclosure in the best way possible. Such terms and words should be construed as meaning and concept consistent with the technical idea of the present disclosure. The embodiments described in this specification and the configurations shown in the drawings are merely preferred embodiments of the present disclosure and are not intended to limit the technical idea of the present disclosure. Therefore, it should be understood that there may exist various equivalents and modifications which may substitute the exemplary embodiments at the time of filing of the present application.

For a more clear understanding of the features and advantages of the present disclosure, the present disclosure will be described in detail with reference to the accompanied drawings. It is to be noted that the same components are designated by the same reference numerals throughout the drawings. In the following description and the accompanied drawings, detailed descriptions of well-known functions or configuration that may obscure the subject matter of the present disclosure will be omitted for simplicity. Also, some components in the accompanying drawings may be exaggerated, omitted, or schematically illustrated for the same reason, and the size of each component does not fully reflect its actual size.

A configuration of a user adaptive conversation apparatus based on monitoring of emotional and ethical states according to an exemplary embodiment of the present disclosure will now be described. FIG. 1 is a block diagram of the user adaptive conversation apparatus based on the monitoring of the emotional and ethical states according to an exemplary embodiment of the present disclosure. Referring to FIG. 1, the user adaptive conversation apparatus based on the monitoring of the emotional and ethical states (hereinbelow, referred to as "conversation apparatus") 100 according to an exemplary embodiment of the present disclosure includes a communication unit 110, a camera unit 120, an audio unit 130, an input unit 140, a display unit 150, a storage unit 160, and a controller 170.

The communication unit 110 communicates with other devices through a network. The communication unit 110 may include a radio frequency (RF) transmitter suitable for up-converting a frequency band of a transmitted signal and amplifying the transmitted signal and a RF receiver suitable for low-noise-amplifying a frequency band of a received signal and down-converting the received signal. The communication unit 110 may include a modem suitable for modulating the transmitted signal and demodulating the received signal. The communication unit 110 provides received data recovered by the modem to the controller 170. Also, the communication unit 110 receives transmit data to be transmitted from the control unit 170 and transmits such data to an external device through the network.

The camera unit 120 which captures an image includes at least an image sensor. The image sensor receives light reflected by an object and converts the light into an electrical signal. The image sensor may be implemented based on a charge coupled device (CCD) or a complementary metaloxide-semiconductor (CMOS) image sensor. The camera unit 120 may further include an analog-to-digital converter, and may convert an analog signal output by the image sensor into a digital signal to output the digital signal to the controller 170.

The audio unit 130 includes a microphone and a speaker. The audio unit 130 receives a voice of a user through the microphone to provide a received voice signal to the controller 170. Also, the audio unit 130 outputs an output voice provided by the controller 170 through the speaker.

The input unit 140 receives a key input of the user suitable for controlling the conversation apparatus 100, generates an input signal corresponding to the key input, and provides the input signal to the controller 170. The input unit 140 may include multiple keys for manipulating the conversation apparatus 100. In case that the input unit 140 is implemented based on a touch panel, the multiple keys may be embodied by keys displayed on the touch panel. Moreover, in a case where all the functions of the input unit 140 can be performed by the touch panel only, the input unit 140 may be integrated with the display unit 150 into a touch panel screen.

The display unit 150 visually provides a menu of the conversation apparatus 100, input data, function settings information, and various other information to the user. In particular, the display unit 150 may display various screens such as a boot screen, a standby screen, and a menu screen of the conversation apparatus 100. The display unit 150 may be implemented by a liquid crystal display (LCD), an organic light emitting diode (OLED), an active matrix organic light emitting diode (AMOLED), or the like. Meanwhile, the display unit 150 may be implemented by a touch panel screen as mentioned above. In such a case, the touch panel screen includes a touch sensor. The touch sensors detects a touch input of the user. The touch sensor may be implemented by a touch sensing sensor such as a capacitive overlay type sensor, a pressure type sensor, a resistive overlay type sensor, or an infrared beam type sensor, or may be implemented by a pressure sensor. Another kinds of sensors capable of sensing a contact or pressure applied by the user can be used as the touch sensor of the present disclosure. When the touch sensor senses a touch input of the user, the touch sensor generates a touch sensing signal to provide to the controller 170.

The storage unit 160 stores a program and data required for the operation of the conversation apparatus 100. In particular, the storage unit 160 may store various data for recognizing and analyzing a natural language. Each data stored in the storage unit 160 can be deleted, changed, or added according to the key manipulation input of the user.

The controller 170 can control signal flows among the internal blocks of the conversation apparatus 100 and perform data processing operations. The controller 170 controls various functional operations of the conversation apparatus 100. The controller 170 may include a central processing unit (CPU), a digital signal processor (DSP), or the like. The controller 170 includes detailed modules for performing a process of a user adaptive conversation.

Figure 2:
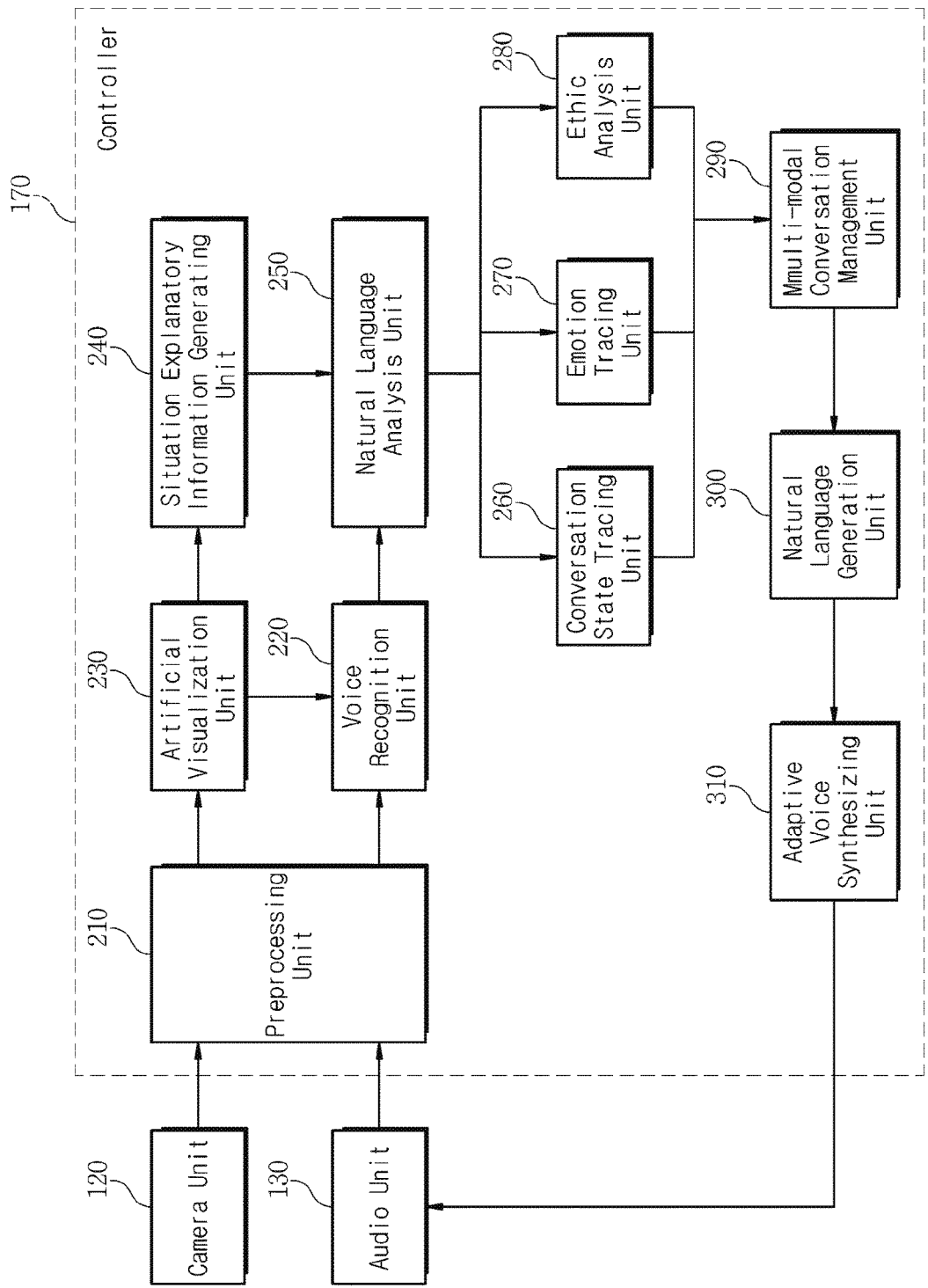
FIG. 2 is a detailed block diagram of a controller for achieving user adaptive conversations according to an exemplary embodiment of the present disclosure.

The detailed configuration of the controller 170 for the user adaptive conversation will now be described in more detail. FIG. 2 is a detailed block diagram of the controller 170 for achieving the user adaptive conversations according to an exemplary embodiment of the present disclosure. Referring to FIG. 2, the controller 170 includes a preprocessing unit 210, a voice recognition unit 220, an artificial visualization unit 230, a situation explanatory information generating unit 240, a natural language analysis unit 250, a conversation state tracing unit 260, an emotion tracing unit 270, an ethic analysis unit 280, a multi-modal conversation management unit 290, a natural language generation unit 300, and an adaptive voice synthesizing unit 310.

During a situation of conversation with the user, the audio unit 130 acquires a voice in the conversation, and the camera unit 120 acquires a video of the conversational situation. The voice may be a voice of the user participating in the conversation, and the video may be a moving picture or a still picture including a face of the user with its surroundings when the user talks. The preprocessing unit 210 receives a voice signal and a video signal from the audio unit 130 and the camera unit 120, respectively. Then, the preprocessing unit 210 removes a noise and the like from the input voice signal to generate voice characteristic information having a form suitable for an analysis, and outputs the voice characteristic information. Also, the preprocessing unit 210 removes a noise and the like from the video signal to generate video characteristic information having a form suitable for the analysis, and outputs the video characteristic information.

The voice recognition unit 220 generates talk information by recognizing the voice characteristic information and converting into a natural language script. The voice recognition unit 220 outputs the talk information having a form of the natural language script.

The artificial visualization unit 230 recognizes a recognizable situation during the conversation based on the video characteristic information to generate situation information indicating an atmosphere of a situation during the conversation. The artificial visualization unit 230 may include an artificial neural network that can perform an image recognition including a facial expression recognition. For example, the artificial visualization unit 230 can generate the situation information by recognizing the facial expression of a talker (e.g., the user) by the artificial neural network. Further, the artificial visualization unit 230 may extract an intention of the user or a context in the talk of the user based on the situation information to generate intention information representing the intention of the user or the context in the talk of the user. The artificial visualization unit 230 may output the situation information and the intention information.

The situation explanatory information generating unit 240 converts the situation information and the intention information output by the artificial visualization unit 230 into a natural language script form. The situation explanatory information generating unit 240 may output the situation information and the intention information of the natural language script form.

The natural language analysis unit 250 performs a natural language analysis such as a morphological analysis, a recognition of entity names, parsing, a semantic recognition, and the like for the talk information, the intention information, and the situation information having the natural language script forms. Then, the natural language analysis unit 250 may output a result of the natural language analysis for the talk information, the intention information, and situation information. The natural language analysis unit 250 may be implemented by a semantic engine.

The conversation state tracing unit 260 generates current talk state information representing an actual meaning implied in the talk of the current conversation based on the talk information, the intention information, and the situation information analyzed by the natural language analysis unit 250, and determines next talk state information related with a response for the talk of the current conversation. The current talk state information represents an interpretation of a meaning of the talk information indicating the script of the user's talk as it is at the time of the conversation according to the intention information and the situation information. Here, the next talk state information may include a plurality of responses. Then, the conversation state tracing unit 260 may output the current talk state information and the next talk state information.

For example, it is assumed that the user and the conversation apparatus 100 are playing games through a game application running in the conversation apparatus 100 and the conversation apparatus 100 has won a game match. It is also assumed that the conversation apparatus 100 has output "Wow. I won." through the audio unit 130 and the user says "Congratulations." It is further assumed that the user's facial expression is recognized to be angry by the artificial visualization unit 230 at this time. In such a case, although the talk information is "Congratulations," the situation information may indicate that the user defeated in the match is angry and the intention information may not be actually congratulating the win of the conversation apparatus 100.

In this example, the current talk state information which is determined based on the intention information and the situation information may indicate whether the talk "Congratulations" is a congratulatory word as it is or a sarcastic meaning. Accordingly, the next talk state information may include a plurality of candidate responses that can be chosen as a response to the current talk state information. In case that the current talk state information indicates that the talk of the user contains the sarcastic meaning, the next talk state information may include a response alleviating the user's mood, a response rebuking the user, and the like as candidate responses.

The emotion tracing unit 270 extracts emotion state information indicating an emotional state of the user based on the talk information, the intention information, and the situation information. Alternatively, the emotion tracing unit 270 may receive an emotional state of the user through the input unit 140 and determine the emotion state information based on the received emotional state.

In an exemplary embodiment, the ethic analysis unit 280 generates ethical state information indicating the ethics of the conversation by analyzing the ethics of the current conversational situation based on the talk information, the intention information, and the situation information. In another embodiment, the ethic analysis unit 280 may transmit the talk information, the intention information, and the situation information to another device through the communication unit 110, so that a user of the other device may evaluate and input an ethics state of the current conversation based on the talk information, the intention information, and the situation information through the other device. The ethic analysis unit 280 may receive the ethics state from the other device through the communication unit 110 to determine the received ethics state as the ethical state information of the current conversation.

The multi-modal conversation management unit 290 receives the next talk state information derived by the conversation state tracing unit 260 and the emotion state information determined by the emotion tracking unit 280, and determines final next talk state information by selecting one of the plurality of responses based on the next talk state information and the emotion state information. If the user is in a state of much anger in the above example, the multi-modal conversation management unit 290 may determine a response that can alleviate the user's mood as the final next talk state information. In another example, if the user's talk violates an ethical standard previously stored in the storage unit 160, a response pointing out that the talk is not appropriate may be determined as the final next talk state information.

The natural language generation unit 300 converts the final talk state information output by the multi-modal conversation management unit 290 into an output conversation script having the natural language script form.

The adaptive voice synthesizing unit 310 generates a voice signal in which an intonation and tone conforming to at least one of the emotion state information, the situation information, and the intention information derived as above is given to the output conversation script. Then, the adaptive voice synthesizing unit 310 outputs the generated voice signal through the audio unit 130.

Figure 3:
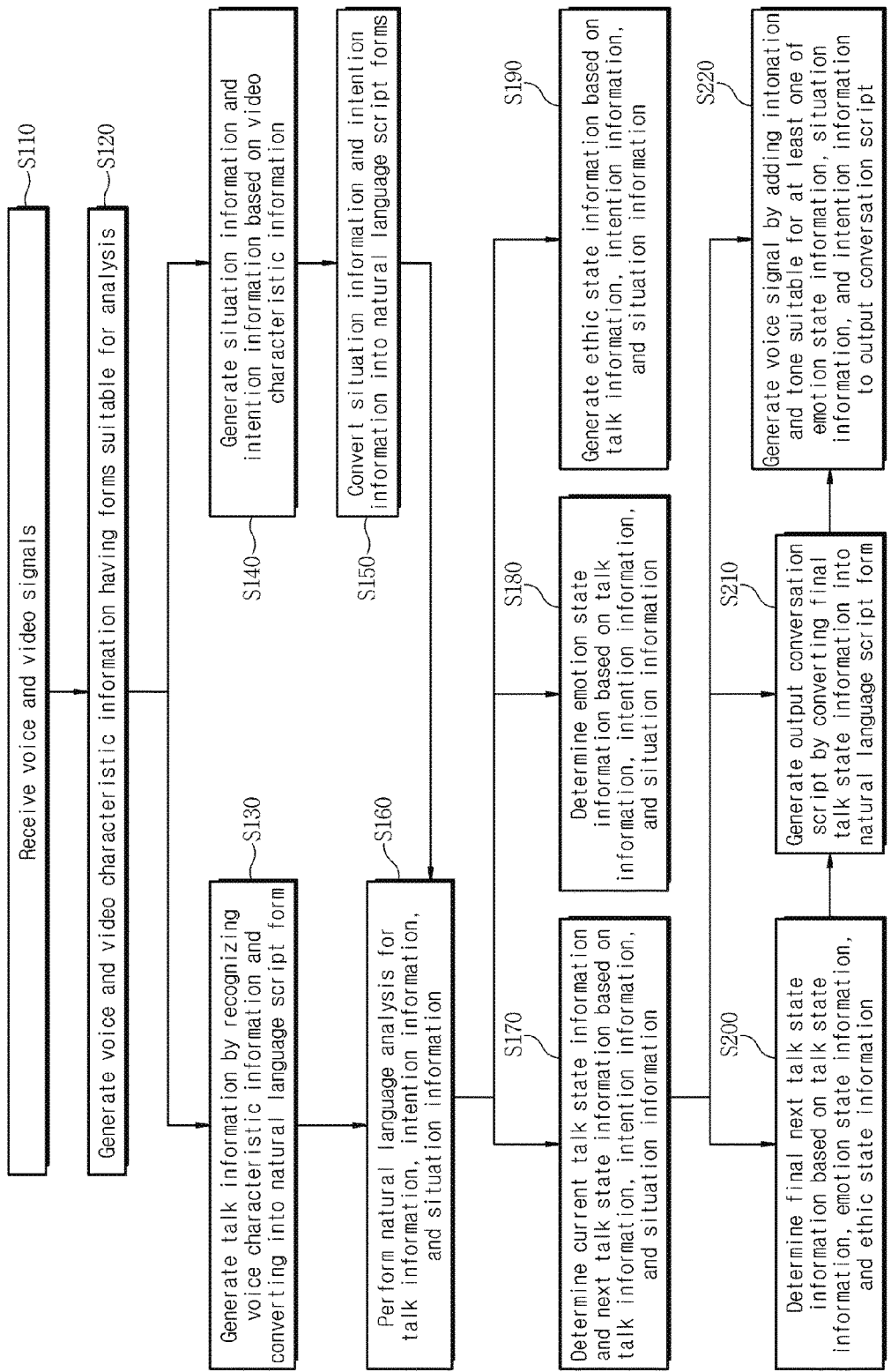
FIG. 3 is a flowchart illustrating a user adaptive conversation method based on monitoring of emotional and ethical states according to an exemplary embodiment of the present disclosure.

The operation of the user adaptive conversation apparatus based on the monitoring of the emotional and ethical states according to an embodiment of the present disclosure will now be described with reference to FIG. 3. FIG. 3 is a flowchart illustrating a user adaptive conversation method based on the monitoring of the emotional and ethical states according to an exemplary embodiment of the present disclosure.

During a conversation with or of the user, the audio unit 130 acquires or records the voice of the conversation, and the camera unit 120 acquires or records the video of the conversational situation. The voice may be the talk of the user participating in the conversation, and the video may be the moving picture or the still picture including the face of the user with its surroundings when the user talks. Accordingly, the preprocessing unit 210 receives the voice signal and the video signal from the audio unit 130 and the camera unit 120, respectively, in step S110. Then, the preprocessing unit 210 the removes the noise and the like from the input voice signal to generate the voice characteristic information having a form suitable for the analysis, and outputs the voice characteristic information in step S120. At the same time, the preprocessing unit 210 removes the noise and the like from the video signal to generate the video characteristic information having a form suitable for the analysis, and outputs the video characteristic information.

The voice recognition unit 220 generates the talk information by recognizing the voice characteristic information and converting into a natural language script in step S130. The voice recognition unit 220 outputs the talk information having a natural language script form.

The artificial visualization unit 230 may include an artificial neural network that can perform the image recognition including, for example, the facial expression recognition. The artificial visualization unit 230 may recognize a recognizable situation during the conversation based on the video characteristic information to generate the situation information indicating the atmosphere of the situation during the conversation in step S140. For example, the artificial visualization unit 230 may generate the situation information by recognizing the facial expression of the talker (e.g., the user) by the artificial neural network. Further, the artificial visualization unit 230 may extract the intention of the user or the context in the talk of the user based on the situation information to generate the intention information representing the intention of the user or the context in the talk of the user. The artificial visualization unit 230 may output the situation information and the intention information. The situation explanatory information generating unit 240 converts the situation information and the intention information output by the artificial visualization unit 230 into natural language script forms in step S150. The situation explanatory information generating unit 240 may output the situation information and the intention information of the natural language script form.

Subsequently, the natural language analysis unit 250 performs the natural language analysis such as the morphological analysis, the recognition of entity names, the parsing, the semantic recognition, and the like for the talk information, the intention information, and the situation information having the natural language script forms in step S160. Then, the natural language analysis unit 250 may output the result of the natural language analysis for the talk information, the intention information, and situation information. The natural language analysis unit 250 may be implemented by a semantic engine.

Upon completion of the natural language recognition or a semantic interpretation of the talk information, the intention information, and the situation information, In step S170, the conversation state tracing unit 260 may extract the current talk state information representing the actual meaning implied in the talk of the current conversation based on the talk information, the intention information, and the situation information, and determine the next talk state information related with a response for the talk of the current conversation. The current talk state information may represent an interpretation of the meaning of the talk information indicating the script of the user's talk as it is at the time of the conversation according to the intention information and the situation information. The next talk state information may include a plurality of responses. For example, it is assumed that the user and the conversation apparatus 100 are playing games through a game application running in the conversation apparatus 100 and the conversation apparatus 100 has won a game match. It is also assumed that the conversation apparatus 100 has output "Wow. I won." through the audio unit 130 and the user says "Congratulations." It is further assumed that the user's facial expression is recognized to be angry by the artificial visualization unit 230 at this time. In such a case, although the talk information is "Congratulations," the situation information may indicate that the user defeated in the match is angry and the intention information may not be actually congratulating the win of the conversation apparatus 100. In this example, the current talk state information which is determined based on the intention information and the situation information may indicate whether the talk "Congratulations" is a congratulatory word as it is or a sarcastic meaning. Accordingly, the next talk state information may include a plurality of candidate responses that can be chosen as a response to the current talk state information. In case that the current talk state information indicates that the talk of the user contains the sarcastic meaning, the next talk state information may include a response alleviating the user's mood, a response rebuking the user, and the like as candidate responses.

Afterwards, the emotion tracing unit 270 determines the emotion state information indicating an emotional state of the user based on the talk information, the intention information, and the situation information in step S180. In an alternative embodiment, the emotion tracing unit 270 may receive an emotional state of the user through the input unit 140 and determine the emotion state information based on the received emotional state.

In step S190, according to an exemplary embodiment, the ethic analysis unit 280 may generate the ethical state information indicating the ethics of the conversation by analyzing the ethics of the current conversational situation based on the talk information, the intention information, and the situation information. In another embodiment, the ethic analysis unit 280 may transmit the talk information, the intention information, and the situation information to another device through the communication unit 110, so that a user of the other device may evaluate and input the ethics state of the current conversation based on the talk information, the intention information, and the situation information through the other device. In such a case, the ethic analysis unit 280 may receive the ethics state from the other device through the communication unit 110 to determine the received ethics state as the ethical state information of the current conversation.

In step S200, the multi-modal conversation management unit 290 receives the next talk state information derived by the conversation state tracing unit 260 and the emotion state information determined by the emotion tracking unit 280, and determines final next talk state information by selecting one of the plurality of responses based on the next talk state information and the emotion state information. If the user is in a state of much anger in the above example, the multi-modal conversation management unit 290 may determine a response that can alleviate the user's mood as the final next talk state information. In another example, if the user's talk violates an ethical standard previously stored in the storage unit 160, a response pointing out that the talk is not appropriate may be determined as the final next talk state information.

The natural language generation unit 300 converts the final talk state information output by the multi-modal conversation management unit 290 into the output conversation script having the natural language script form in step S210.

Finally, in step S220, the adaptive voice synthesizing unit 310 generates the voice signal in which an intonation and tone conforming to at least one of the emotion state information, the situation information, and the intention information derived as above is given to the output conversation script. Then, the adaptive voice synthesizing unit 310 outputs the generated voice signal through the audio unit 130.

According to the present disclosure, the emotion state of the user currently in conversation is recognized, and the monitoring result is applied to the conversation system to maintain a conversation confirming to the emotion state of the user. The present disclosure may apply a monitoring result for the ethics of the current conversation to the conversation system to prevent any unethical conversation. The present disclosure can provide a customized conversation apparatus and method which take emotional, ethical, and personalized characteristics of conversation user into account.

The method according to exemplary embodiments of the present disclosure may be implemented in a form of a program readable by various computing devices and may be recorded in a computer-readable storage medium. Here, the storage medium may store program instructions, data files, data structures, and a combination thereof. The program instructions recorded on the storage medium may be those specifically designed and constructed for the present disclosure or may be those available to those skilled in the art of computer software. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, and the flash memory, erasable and programmable ROM (EPROM), and electrically erasable and programmable ROM (EEPROM), all of which are hardware devices suitable for storing the computer program instructions and data. The program instructions may be coded in, for example, a machine language or a high-level language that may be complied or interpreted by a compiler or an interpreter, respectively. The hardware device may be configured to operate similarly to one or more software modules to perform the operations required for the present disclosure, and vice versa.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made therein without departing from the spirit and scope as defined by the following claims.

What is claimed is:

1. A user adaptive conversation apparatus, comprising:
   a voice recognition unit configured to convert a talk of a user in a conversational situation into a natural language script form to generate talk information;
   an artificial visualization unit having an artificial neural network and configured to:
      recognize, by using the artificial neural network, a facial expression of the user from a video acquired in the conversational situation;
      generate situation information indicating a talking situation based on the recognized facial expression of the user;
      determine an intention of the talk based on the situation information; and
      generate intention information indicating the intention of the talk;
   a natural language analysis unit configured to convert the situation information and the intention information into the natural language script form;
   a natural language analysis unit configured to perform a natural language analysis for the talk information, the intention information, and the situation information;
   a conversation state tracing unit configured to generate current talk state information representing a meaning of the talk information by interpreting the talk information according to the intention information and the situation information, and determine next talk state information that includes a plurality of candidate responses corresponding to the current talk status information;
   an emotion tracing unit configured to generate emotion state information indicating an emotional state of the user based on the talk information, the intention information, and the situation information;
   an ethic analysis unit configured to generate ethical state information indicating ethics of the conversation based on the talk information, the intention information, and the situation information; and
   a multi-modal conversation management unit configured to select one of the plurality of candidate responses according to at least one of the emotion state information and the ethical state information to determine final next talk state information including a selected response.

2. The user adaptive conversation apparatus of claim 1, further comprising:
   a natural language generation unit configured to convert the final talk state information into an output conversation script having the natural language script form; and
   an adaptive voice synthesizing unit configured to synthesize a voice signal in which an intonation and conforming to at least one of the emotion state information, the situation information, and the intention information is given to the output conversation script.

3. A user adaptive conversation method, comprising:
   converting a talk of a user in a conversational situation into a natural language script form to generate talk information;
   recognizing, by using an artificial neural network, a facial expression of the user from a video acquired in the conversational situation;
   generating situation information indicating a talking situation based on the recognized facial expression of the user;
   determining an intention of the talk based on the situation information;
   generating intention information indicating the intention of the talk;
   converting the situation information and the intention information into the natural language script form;
   performing a natural language analysis for the talk information, the intention information, and the situation information;
   generating current talk state information representing a meaning of the talk information by interpreting the talk information according to the intention information and the situation information;
   determining next talk state information that includes a plurality of candidate responses corresponding to the current talk status information;
   generating emotion state information indicating an emotional state of the user based on the talk information, the intention information, and the situation information;
   generating ethical state information indicating ethics of the conversation based on the talk information, the intention information, and the situation information; and
   selecting one of the plurality of candidate responses according to at least one of the emotion state information and the ethical state information to determine final next talk state information including a selected response.

4. The user adaptive conversation method of claim 3, further comprising:
   converting the final talk state information into an output conversation script having the natural language script form; and
   synthesizing a voice signal in which an intonation and conforming to at least one of the emotion state information, the situation information, and the intention information is given to the output conversation script.

* * * * *